United States Patent Office 3,838,133
Patented Sept. 24, 1974

3,838,133
1,4,5,8,9,12-HEXAHYDRO - 4,8,12 - TRIOXOPYRIDO (2,3-f) (1,7) PHENANTHROLINE - 2,6,10-TRICARBOXYLATE COMPOUNDS
Charles M. Hall and Herbert G. Johnson, Kalamazoo, Mich., assignors to The Upjohn Company, Kalamazoo, Mich.
No Drawing. Filed Sept. 8, 1972, Ser. No. 287,426
Int. Cl. C07d 33/48
U.S. Cl. 260—286 R                  6 Claims

ABSTRACT OF THE DISCLOSURE

Compounds of the formula

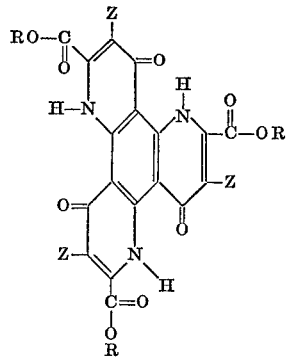

Ia are useful in the propylactic treatment of sensitized humans and animals for allergy and all anaphylactic reactions of a reagin or non-reagin mediated nature.

Compositions of these compounds formulated with pharmaceutical carriers and methods of using these compositions are also provided.

BRIEF SUMMARY OF THE INVENTION

Compounds of FIG. 1 are useful in humans and animals for the prophylactic treatment of allergy or anaphylactic reactions of a reagin or non-reagin mediated nature. Compositions and methods of using the compositions are also provided.

DETAILED DESCRIPTION OF THE INVENTION

In accordance with the invention, we provide compounds represented by Structure 1a

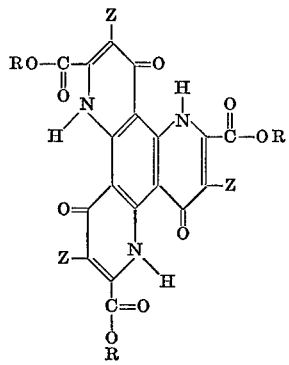

Ia wherein it is understood that 1a can exist in its tautomeric form 1b and that the compounds of this invention are likely to be mixtures of all tautomeric forms, the percentages of each tautomer to be at least partially dependent on the nature of R and Z, and the physical environment of the compound.

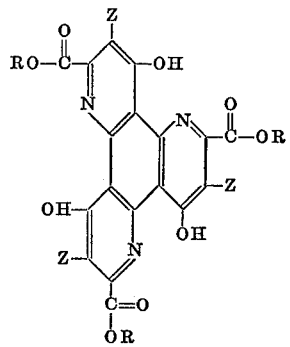

Ib

For the purpose of brevity throughout the application and appended claims, the compounds will be referred to hereinafter in their keto form, Structure 1a.

The R substituent is selected from the group consisting of hydrogen, alkyl from one of three carbon atoms, inclusive, phenyl, an alkali metal, calcium, aluminum, and an amine cation. Z is selected from the group consisting of hydrogen, alkyl from one to three carbon atoms, inclusive, and phenyl.

Preferred compounds are where R is selected from the group consisting of hydrogen, an alkali metal, calcium, aluminum, and an amine cation. Z is hydrogen. The most preferred compound is where R is the salt of tris(hydroxymethyl)aminomethane and Z is hydrogen.

As employed in the above disclosure and throughout the specification, the term "alkyl" is methyl, ethyl, propyl and isopropyl when limited to three carbon atoms; alkali metal includes sodium and potassium, and the term "amine cation" includes all pharmaceutically acceptable cations from amines, including, for example, cations from the amines, ammonia, tris(hydroxymethyl) aminomethane D-threo-2-amino-1-p-nitrophenyl-1,3-propanediol, N,N-bis(hydroxyethyl)-piperazine, 2-amino-2-methyl-1-propanol, 2-amino-2-methyl-1,3-propanediol and 2,2-bis(hydroxymethyl) - 2,2',2" - nitrilotriethanol and $H_2NR'$, $HNR'_2$ and $NR'_3$ wherein R' is selected from the group consisting of alkyl from one to three carbon atoms and —$CH_2CH_2OH$.

The compounds of this invention can be prepared by methods known to the art. The basic synthetic pathway employed is the reaction of 1,3,5-triaminobenzene (II) with an oxaloacetate sodium salt (III) in the presence of a solvent to form the triadduct (IV). The R group is limited to the alkyl group of from one to three carbon atoms, inclusive; and phenyl. Ring closure to the desired compound (1a) is accomplished by heating the triadduct at appropriate conditions.

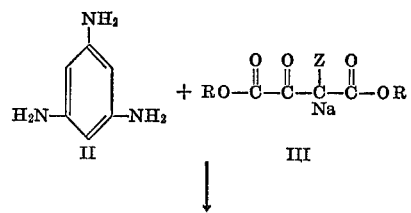

II         III

↓

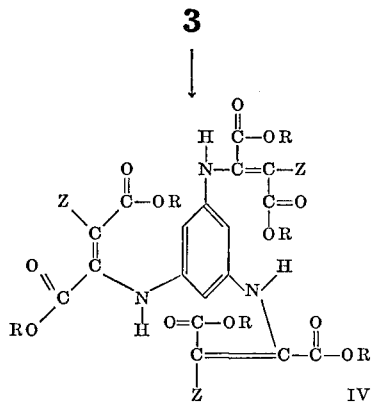

After the above synthesis has been carried out, the carboxylate can be transesterified to other esters or hydrolyzed to the carboxy acid. The carboxy acid is converted to the metal or amine cation by standard methods.

The 1,3,5-triaminobenzene is readily available from the reduction of 3,5-dinitroaniline by hydrogen over a palladium on charcoal catalyst. Other reduction procedures such as iron and hydrochloric acid in ethanol or stannous chloride in acid can be employed.

The second reactant, the oxaloacetate sodium salt derivative is also readily available. Compounds where R is ethyl and Z is hydrogen, methyl, ethyl, or phenyl are known in the art. Where Z is hydrogen, an alternative reagent to the oxaloacetate sodium salt derivative is available to form the triadduct. Acetylene dicarboxylate (V), where R is limited to alkyl of from one to three carbon atoms, inclusive, or phenyl, can be added to the 1,3,5-triaminobenzene to form the triadduct (IV), where Z is hydrogen, as illustrated below:

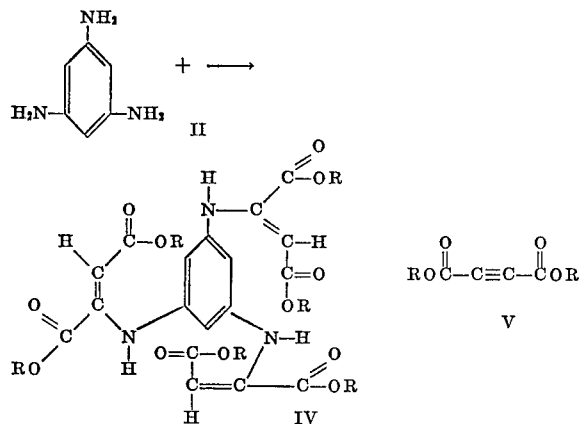

In the formation of the triadduct and subsequent ring closure, the following processing conditions can be observed.

When using the oxaloacetate reagent to form the triadduct there should be a sufficient amount of acid present to protonate the oxaloacetate carbanion and catalyze the removal of the keto grouping as water. The acid can also serve as a solvent for the two reagents as well. For example, glacial acetic acid, propionic acid, p-toluene sulfonic acid, and butyric acid are acids which can be used. If a further reagent is needed to place the two reactants into solution (or a cosolvent desired), benzene, toluene, diethyl ether, dioxane, tetrahydrofuran, or alcohols from one to about four carbon atoms can be employed. The length of time for the formation of the triadduct is temperature dependent. At room temperature the reaction proceeds rather slowly but as the temperature is raised, reaction time is decreased. Acceptable reaction times are achieved at temperatures ranging from about 40 to about 70° C., although reaction temperatures can be above 100° C. if desired.

With regard to the use of the acetylene dicarboxylate reactant in the formation of the triadduct, appropriate solvents are alcohols having from one to about six carbon atoms, preferably one to about three carbon atoms, benzene, diethyl ether, dioxane, tetrahydrofuran, or any other solvent which places both of the reactants in solution and allows the desired compound to form. Generally, the reaction proceeds readily at room temperature and can be promoted by an increase in temperature to about 100° C.

Ring closure of the triadduct prepared by the methods disclosed above, and formation of the desired compound can be accomplished by heating the triadduct at a relatively high temperature. This heating can be done to the neat triadduct. However, it is preferred to use a solvent which can function as a heat transfer medium. Any high boiling inert solvent such as a mineral oil, hexamethylphosphoric triamide, diphenyl ether, or Dowtherm A®, which appears to be primarily diphenyl ether, is suitable. The ring cyclization step is preferably carried out at temperatures of from about 220° C. to about 280° C., although lower or higher temperatures can be employed if desired. A particularly preferred solvent is Dowtherm A or diphenyl ether, which boil at about 250° C., thus enabling the ring cyclization to occur during reflux.

An additional advantage of the elevated temperature during the ring cyclization step is that any triadduct formed in the preceding step which is not in a position to cyclize since it is trans to the benzene ring, is isomerized to the cis configuration during the heating, thereby allowing substantial yields of the desired compound to be produced. This trans adduct preparation occurs more frequently when an aprotic solvent and acetylene dicarboxylate are used in the adduct formation step.

As stated previously, at this point various esters, the acid, or salts can be prepared at the R position of the carboxy group. Different esters can be prepared by standard transesterification reactions. Ester groups are converted to the acid by treatment with base and acid. The acid can then be easily converted to the amine or metal salts by contacting the triacid with three equivalents of the desired amine or alkali metal hydroxide and heating in a sufficient amount of water to effect solubilization. The crystalline salts can be precipitated by the addition of methanol.

Following is an illustrative list of compounds in accordance with the invention which are prepared by the above procedures:

TABLE I

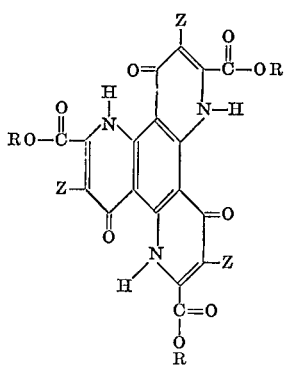

| R | Z |
|---|---|
| H | H |
| $C_2H_5$ | H |
| $iC_3H_7$ | H |
| $C_6H_5$ | H |
| Na | H |
| THAM* | H |
| H | $CH_3$ |
| $CH_3$ | $C_2H_5$ |
| $C_3H_7$ | $C_3H_7$ |
| $C_6H_5$ | $iC_3H_7$ |
| K | $C_6H_5$ |
| $NH_4^+$ | H |
| Ca | H |

*Tris(hydroxymethyl)methylammonium.

The following examples are compounds in accordance with this invention. The compounds are intended not to limit but merely to exemplify the invention.

EXAMPLE 1

Trimethyl 1,4,5,8,9,12 - hexahydro - 4,8,12-trioxopyrido-[2,3-f][1,7]phenanthroline-2,6,10-tricarboxylate 1.0 grams of 3,5-dinitroaniline is dissolve in 50 ml. of absolute methanl and 100 mg. of 5% palladium on charcoal is added. The reduction is carried out in a Parr apparatus for two hours. The solution is rapidly filtered with suction and the catalyst washed with a few cc. of methanol. 2.5 grams of dimethylacethylene dicarboxylate is added dropwise to the solution of 1,3,5-triaminobenzene. The reaction mixture is stirred at room temperature for 18 hours during which time the yellow product, a 1:3 adduct, precipitates and is collected by filtration (1.67 g.) M.P. 151–156°. Recrystallization gives a material melting at 158.5–160.5°.

*Analysis.*—Calcd. for $C_{24}H_{27}O_{12}N_3$: C, 52.46; H, 4.95; N, 7.65. Found: C, 52.53; H, 4.99; N, 7.57.

U.V., IR and NMR are in agreement with the structure.

1.0 gram of the 1:3 adduct is added to refluxing Dowtherm A (ca. 250°) and the mixture heated at reflux temperature for ten minutes. The reaction mixture is cooled and the yellow crystalline product collected by filtration (.73 g.) M.P. >320°. The mass spectrum (mol. ion=453 m/e) and infrared spectrum (Nujol) are in agreement with the proposed structure.

EXAMPLE 2

1,4,5,8,9,12 - Hexahydro-4,8,12-trioxopyrido-[2,3-f][1,7]-phenanthroline-2,6,10-tricarboxylic acid (U–39,657)

0.5 g. of the trimethyl ester prepared above, is heated in 5% aqueous NaOH at reflux for one hour. The reaction mixture is cooled and the light green crystalline trisodium salt collected by filtratoin (.6 g.) M.P. >320°. 0.4 g. of the trisodium salt is dissolved in 50 ml. of water and acidified with concentrated HCl to give the desired triacid as a tan colored solid (.24 g.) M.P. >320°.

The compositions of the present invention are presented for administration to humans and animals in unit dosage forms, such as tablets, capsules, pills, powder, granules sterile parenteral solutions or suspensions, and oral solutions or suspensions, and oil-in-water and water-in-oil emulsions containing suitable quantities of the compound of Formula Ia. The preferred method of administration is by inhalation into the lung by means of an aerosol liquid or powder for insufflation. Another preferred route of administration with these compounds, particularly where R is tris(hydroxymethyl)methylammonium and Z is hydrogen, is oral.

For oral administration either solids or fluid unit dosage forms can be prepared. For preparing solid compositions such as tablets, the compound of Formula Ia is mixed with conventional ingredients such as talc, magnesium stearate, dicalcium phosphate, magnesium aluminum silicate, calcium sulfate, starch, lactose, acacia, methylcellulose, and functionally similar materials as pharmaceutical diluents or carriers. Capsules are prepared by mixing the compound with an inert pharmaceutical diluent and filling the mixture into a hard gelatin capsule of appropriate size. Soft gelatin capsules are prepared by machine encapsulation of a slurry of the compound with an acceptable vegetable oil, light liquid petrolatum or other inert oil.

Fluid unit dosage forms for oral administration such as syrups, elixirs, and suspensions can be prepared. The water-soluble forms can be dissolved in an aqueous vehicle together with sugar, aromatic flavoring agents and preservatives to form a syrup. An elixir is prepared by using a hydro-alcoholic (ethanol) vehicle with suitable sweeteners such as sugar and saccharin, together with an aromatic flavoring agent.

Suspensions can be prepared with an aqueous vehicle with the aid of a suspending agent such as acacia, tragacanth, methylcellulose and the like.

For parenteral administration, fluid unit dosage forms are prepared utilizing the compound and a sterile vehicle, water being preferred. The compound, depending on the vehicle and concentration used, can be either suspended or dissolved in the vehicle. In preparing solutions the compound can be dissolved in water for injection and filter sterilized before filling into a suitable vial or ampul and sealing. Advantageously, adjuvants such as a local anesthetic, preservative and buffering agents can be dissolved in the vehicle. To enhance the stability, the composition can be frozen after filling into the vial and the water removed under vacuum. The dry lyophilized powder is then sealed in the vial and an accompanying vial of water for injection is supplied to reconstitute the liquid prior to use. Parenteral suspensions are prepared in substanially the same manner except that the compound is suspended in the vehicle instead of being dissolved and sterilization cannot be accomplished by filtration. The compound can be sterilized by exposure to ethylene oxide before suspending in the sterile vehicle. Advantageously, a surfactant or wetting agent is included in the composition to facilitate uniform distribution of the compound.

Additionally, a rectal suppository can be employed to deliver the active compound. This dosage form is of particular interest where the mammal cannot be treated conveniently by means of other dosage forms, such as orally or insufflation, as in the case of young children or debilitated persons. The active compound can be incorporated into any of the known suppository bases by methods known in the art. Examples of such bases include coca butter, polyethylene glycols (Carbowaxes), polyethylene sorbitan monostearate, and mixtures of these with other compatible materials to modify the melting point or dissolution rate. These rectal suppositories can weight from about 1 to 2.5 gm. and can contain an amount of the active compound equivalent to the oral dose.

The preferred compositions are those adapted for inhalation into the lung and containing a compound of the invention which is water-soluble. For treatment of allergic conditions of the nose, such as rhinitis, compositions adapted for contact with nasal linings are preferred.

Compositions for inhalation are of three basic types: (1) a powder mixture preferably micropulverized; (2) an aqueous solution to be sprayed with a nebulizer; and (3) an aerosol with volatile propellant in a pressurized container.

The powders are quite simply prepared by mixing a compound of the formula with a solid base which is compatible with lung tissue, preferably lactose. The powders are packaged in a device adapted to emit a measured amount of powder when inhaled through the mouth.

Aqueous solutions are prepared by dissolving the compound of the Formula Ia in water and adding salt to provide an isotonic solution and buffering to a pH compatible with inhalation. The solutions are dispersed in a spray device or nebulizer and sprayed into the mouth while inhaling.

Aerosols are prepared by dissolving a compound of the Formula Ia in water or ethanol and mixing with a volatile propellant and placing in a pressurized container having a metering valve to release a predetermined amount of material.

The liquefied propellant employed is one which has a boiling point below 65° F. at atmospheric pressure. For use in compositions intended to produce aerosols for medicinal use, the liquefied propellant should be nontoxic. Among the suitable liquefied propellants which may be employed are the lower alkanes containing up to five carbon atoms, such as butane and pentane, or a lower alkyl chloride, such as methyl, ethyl, or propyl chlorides. Further suitable liquefied propellants are the fluorinated and fluorochlorinated lower alkanes such as are sold under the trademarks "Freon" and "Genetron." Mixtures of the above-mentioned propellants may suitably be employed. Examples of these propellants are dichlorodifluoromethane ("Freon 12"), dichlorotetrafluoroethane ("Freon 114"), trichloromonofluoromethane ("Freon 11"), dichloromonofluoromethane ("Freon 21"), monochlorodifluoromethane ("Freon 22"), trichlorotrifluoroethane ("Freon 113"), difluoroethane ("Genetron 142–A") and monochlorotrifluoromethane ("Freon 13").

The term "unit dosage form," as used in the specification and claims, refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular effect to be achieved and (b) the limitations inherent in the art of compounding such an active material for use in humans and animals, as disclosed in detail in this specification, these being features of the present invention. Examples of suitable unit dosage forms in accord with this invention are tablets, capsules, pills, suppositories, powder packets, wafers, granules, cachets, teaspoonfuls, tablespoonfuls, dropperfuls, ampuls, vials, aerosols with metered discharges, segregated multiples of any of the foregoing, and other forms as herein described.

An effective but non-toxic quantity of the compound is employed in treatment. The dosage of the compound for treatment depends on the route of administration. A dosage schedule of from about 0.1 to about 100 mg. of compound in a single dose administered parenterally or by inhalation in the compositions of this invention are effective for preventing allergy attacks. More specifically, the single dose is from about 0.5 to about 10 mg. of compound. The oral and rectal dose is from about 1 to about 200 mg. in a single dose. More specifically, the single dose is from about 1 to about 50 mg. of compound. The dosage to be administered can be repeated up to four times daily. However, when it is necessary to repeat treatment, a preferred dosage schedule reduces the secondary treatment dosage to from about 0.5 percent to about 20 percent of the above dosages, more specifically, from about 1 to about 10 percent of the above dosages. In this manner, a state of allergy prophylaxis can be maintained. The reduced dosage is taken until that dosage no longer provides effective protection. At that time, the larger dosage is repeated, followed by the reduced dosage. An example of such a dosage schedule is the following: An asthmatic individual insufflates 0.5 mg. of the tris-(hydroxymethyl)aminomethane salt of 1,4,5,8,9,12-hexahydro-4,8,12 - trioxopyrido[2,3 - f][1,7]phenanthroline-2,6,10-tricarboxylic acid. After a time span of four hours the individual insufflates 0.005 mg. of the same compound and every four to six hours thereafter insufflates 0.005 mg. of the same compound until effective asthma prophylaxis is not provided. The individual then insufflates 0.5 mg. of the same compound, then reduces the insufflation dosage to 0.005 mg. four to six hours later. The dosage schedule continues in this manner.

The administration of the compositions of the present invention to humans and animals provides a method for the prophylactic treatment of allergy or all anaphylactic reactions of a reagin or a non-reagin mediated nature. That is to say these compositions, when administered to a sensitized individual prior to the time than the individual comes into contact with substances (antigens) to which he is allergic, will prevent the allergic reaction which would otherwise occur.

For example, the process can be used for prophylactic treatment of such chronic conditions as bronchial asthma, allergic rhinitis, food allergy, hay fever, urticaria, autoimmune diseases, exercise induced asthma, stress induced asthma, and bird facier's disease.

EXAMPLE 3

A lot of 10,000 tablets, each containing 10 mg. of trisodium 1,4,5,8,9,12-hexahydro - 4,8,12 - trioxopyrido[2,3-f][1,7]phenanthroline-2,6,10 - tricarboxylate is prepared from the following types and amounts of ingredients:

|  | Gm. |
|---|---|
| Trisodium 1,4,5,8,9,12-hexahydro - 4,8,12 - trioxopyrido[2,3-f][1,7]phenanthroline-2,6,10 - tricarboxylate | 100 |
| Dicalcium phosphate | 1,000 |
| Methylcellulose, U.S.P. (15 cps.) | 60 |
| Talc | 150 |
| Corn Starch | 200 |
| Calcium stearate | 12 |

The compound and dicalcium phosphate are mixed well, granulated with 7.5 percent solution of methylcellulose in water, passed through a No. 8 screen and dried carefully. The dried granules are passed through a No. 12 screen, mixed thoroughly with the talc, starch and magnesium stearate, and compressed into tablets.

These tablets are useful in preventing hay fever attacks at a dose of 1 tablet every four to six hours.

EXAMPLE 4

One thousand two-piece hard gelatin capsules, each containing 10 mg. of trimethyl 1,4,5,8,9,12-hexahydro-4,8,12 - trioxopyrido[2,3 - f][1,7]phenanthroline - 2,6,10-tricarboxylate are prepared from the following types and amounts of ingredients:

|  | Gm. |
|---|---|
| Trimethyl 1,4,5,8,9,12 - hexahydro - 4,8,12 - trioxopyrido[2,3 - f][1,7]phenanthroline - 2,6,10 - tricarboxylate | 10 |
| Talc | 150 |
| Magnesium stearate | 1 |

The ingredients are mixed well and filled into capsules of the proper size.

Capsules so prepared are useful in preventing attacks of bronchial asthma at a dose of one capsule every four to six hours.

EXAMPLE 5

One thousand tablets, each containing 10 mg. of trimethyl 1,4,5,8,9,12 - hexahydro - 4,8,12 - trioxopyrido-[2,3-f][1,7]phenanthroline - 2,6,10 - tricarboxylate are prepared from the following types and amounts of ingredients:

|  | Gm. |
|---|---|
| Trimethyl 1,4,5,8,9,12 - hexahydro - 4,8,12 - trioxopyrido[2,3 - f][1,7]phenanthroline - 2,6,10 - tricarboxylate | 10 |
| Microcrystalline cellulose NF | 420 |
| Starch | 100 |
| Magnesium stearate powder | 5 |

The ingredients are screened and blended together and pressed into 535 mg. tablets.

The tablets are useful to protect against food allergy at a dose of 1 tablet before meals.

EXAMPLE 6

A sterile preparation suitable for intramuscular injection and containing 1 mg. of trimethyl 1,4,5,8,9,12 - hexahydro - 4,8,12 - trioxopyrido[2,3 - f][1,7]phenanthroline- 2,6,10 - tricarboxylate in each milliliter is prepared from the following ingredients:

Trimethyl 1,4,5,8,9,12 - hexahydro - 4,8,12 - trioxopyrido[2,3, - f][1,7]phenanthroline - 2,6,10-tricarboxylate _____ gm__ 1
Benzyl benzoate _____ ml__ 200
Methylparaben _____ gm__ 1.5
Propylparaben _____ gm__ 0.5
Cottonseed oil q.s. _____ ml__ 1,000

One milliliter of this sterile preparation is injected for prophylactic treatment of allergic rhinitis.

EXAMPLE 7

Six hundred ml. of an aqueous solution containing 1.0 mg. of the tris(hydroxymethyl)aminomethane (THAM) salt of 1,4,5,8,9,12 - hexahydro - 4,8,12 - trioxopyrido-[2,3 - f][1,7]phenanthroline - 2,6,10 - tricarboxylic acid per ml. is prepared as follows:

Tris(hydroxymethyl)aminomethane salt of 1,4,5,8,9, 12 - hexahydro - 4,8,12 - trioxopyrido - [2,3 - f] [1,7]tricarboxylic acid _____ gm__ 0.6
Sodium chloride _____ gm__ 5
Water for injection q.s. _____ ml__ 600

The THAM salt and sodium chloride are dissolved in sufficient water to make 600 ml. and sterile filtered.

The solution is placed in nebulizers designed to deliver 0.25 ml. of solution per spray.

The solution is inhaled into the lungs every four to six hours for prevention of asthmatic attacks.

EXAMPLE 8

A powder mixture consisting of 0.05 gram of tris-(hydroxymethyl)aminomethane salt of 1,4,5,8,9,12 - hexahydro - 4,8,12 - trioxopyrido[2,3-f][1,7]phenanthroline-2,6,10 - tricarboxylic acid and sufficient lactose to make 5 grams of mixture is micropulverized and placed in an insufflator designed to deliver 50 mg. of powder per dose.

The powder is inhaled into the lungs every four to six hours for prevention of asthmatic attacks.

EXAMPLE 9

Twelve grams of an aerosol composition are prepared from the following ingredients:

|   | Gm. |
|---|---|
| Tris(hydroxymethyl)aminomethane salt of 1,4,5,8, 9,12 - hexahydro - 4,8,12 - trioxopyrido[2,3-f] [1,7]phenanthroline-2,6,10-tricarboxylic acid | 0.25 |
| Freon 12 | 1.440 |
| Freon 114 | 2.160 |
| Water | 7.550 |
| Sorbitan monoleate | 0.600 |

The THAM salt is dissolved in the water and combined with the other constituents under pressure. The twelve grams of composition are added to a 13 cc. plastic coated bottle and capped with a metering valve. The metering valve releases 80 mg. of composition in an aerosol. The aerosol is inhaled every four to six hours for prevention of asthmatic attacks.

EXAMPLE 10

In individuals who require continual treatment in the Examples 3 through 9, the dosage of the Example is given initially and each succeeding administration of the drug is at 1/50 of the initial dosage. This maintenance dosing is continued until effective allergy prophylaxis is not obtained. The initial dosage of Examples 3 through 9 is then started once more, followed by the maintenance dosages.

EXAMPLE 11

After allowing for the differing solubilities of the compounds and the activity of the particular compound as measured by the in vivo rat passive cutaneous anaphylaxis assay, a suitable quantity of each of the compounds of Table I are substituted for the active compound in the compositions and uses of Examples 3 through 9. Results showing anti-allergy activity are obtained.

EXAMPLE 12

The rat passive cutaneous anaphylaxis assay is run in the following manner:

Female Sprague-Dawley 250 gm. rats are skin-sensitized with rat anti-ovalbumin homocytotropic antibody that is heat labile and has a passive cutaneous anaphylaxis titer of 1:128. After a 72-hour latency period, the animals are challenged i.v. with 4 mg. ovalbumin (OA)+5 mg. Evans blue dye and the test compound. Thirty minutes later the extravascular bluing that results from antigen antibody combination at the skin site is read. Antibody dilutions are used such that in control animals a 4 mm. spot is the lowest detectable spot, and 4 or 5 lower dilutions are used to give a range of antibody in each animal. Four to five animals are used for each variable in the experiment. Percent inhibition of the PCA assay is calculated by comparing the spot scores of treated rats with the spot scores of control rats. The spot score is the total number of detectable spots over the number of animals.

The tris(hydroxymethyl)aminomethane salt of 1,4,5,8, 9,12 - hexahydro - 4,8,12 - trioxopyrido[2,3 - f][1,7]-phenanthroline - 2,6,10 - tricarboxylic acid is prepared by dissolving the tricarboxylic acid in an equivalent weight of aqueous tris(hydroxymethyl)aminomethane and is tested in the rat passive cutaneous anaphylaxis assay in the above manner except that when the test is run for assessing oral activity, the compound is given orally 90 minutes prior to antigen challenge.

The inhibitory dose $_{50}$ for the tris(hydroxymethyl)-aminomethane salt of 1,4,5,8,9,12 - hexahydro - 4,8,12-trioxopyrido[2,3 - f[1,7] - phenanthroline - 2,6,10 - tricarboxylic acid when given i.v. is 0.05 mg./kg. and 25 mg./kg. when given orally.

What is claimed is:

1. A compound of the formula

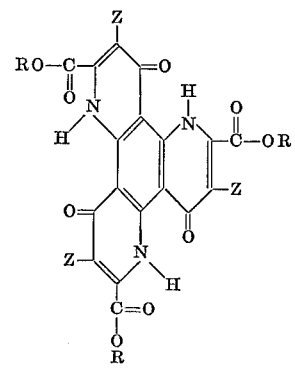

wherein R is selected from the group consisting of hydrogen, alkyl from one to three carbon atoms, inclusive, phenyl, an alkali metal, calcium, and a pharmaceutically acceptable and compatible with the amine utility amine cation and Z is selected from the group consisting of hydrogen, alkyl from one to three carbon atoms, inclusive, and phenyl.

2. A compound in accordance with Claim 1 wherein R is selected from the group consisting of hydrogen, an alkali metal, calcium, and a pharmaceutically acceptable and compatible with the amine utility amine cation and Z is hydrogen.

3. Tri tris(hydroxymethyl)methylammonium 1,4,5,8,9, 12 - hexahydro - 4,8,12 - trioxopyrido[2,3 - f][1,7] phenanthroline-2,6,10-tricarboxylate according to Claim 1.

4. Trisodium 1,4,5,8,9,12 - hexahydro - 4,8,12 - trioxopyrido[2,3, - f][1,7]phenanthroline - 2,6,10 - tricarboxylate according to Claim 1.

5. Tripotassium 1,4,5,8,9,12 - hexahydro - 4,8,12 - trioxopyrido[2,3 - f][1,7]phenanthroline - 2,6,10 - tricarboxylate according to Claim 1.

6. 1,4,5,8,9,12 - hexahydro - 4,8,12 - trioxopyrido[2,3-f][1,7]phenanthroline - 2,6,10 - tricarboxylic acid according to Claim 1.

References Cited

FOREIGN PATENTS 2,149,692  10/1971  Germany _____ 260—287 R

OTHER REFERENCES

Chemical Abstracts, vol. 77, 1972, 75201G, Waring.

DONALD G. DAUS, Primary Examiner

M. C. VAUGHN, Assistant Examiner

U.S. Cl. X.R.

260—268 R, 270 R, 283 SY, 287 R, 288 P, 289 R; 424—250, 258